April 12, 1960

E. H. CABANISS ET AL 2,932,815

MAGNETIC CORE LOGIC UNITS

Filed June 17, 1957

Inventors:
Edward H. Cabaniss,
Clarence P. Christensen,
by Carl Baker
Their Attorney.

2,932,815

MAGNETIC CORE LOGIC UNITS

Edward H. Cabaniss, Schenectady, N.Y., and Clarence P. Christensen, Phoenix, Ariz., assignors to General Electric Company, a corporation of New York Application June 17, 1957, Serial No. 666,003
12 Claims. (Cl. 340—174)

Figure 1:
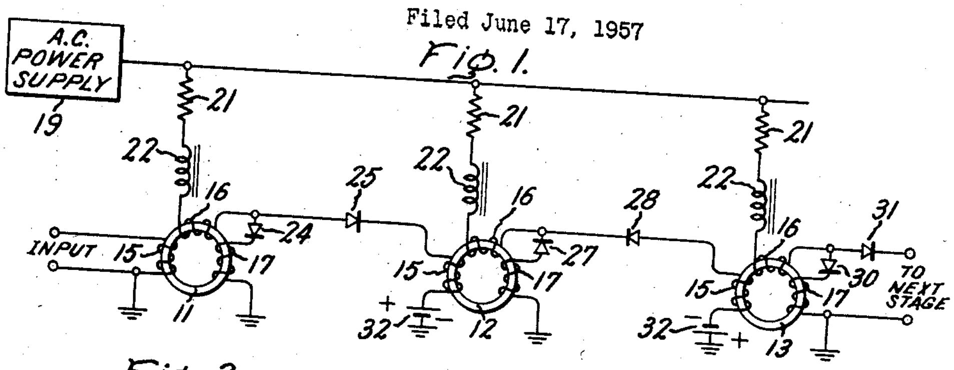

This invention relates to magnetic core logic circuits as used in digital computers and other data handling systems, and has as its principal object the provision of new and improved magnetic core logic circuits providing desired logic depth and desired number of logic functions with minimum power supply requirement and optimum efficiency of operation.

Magnetic core logic circuits have heretofore found wide use in digital computers and like devices and offer many well recognized advantages over corresponding vacuum tube circuitry. To some extent, however, these known magnetic core circuits share with vacuum tubes the disadvantage of requiring relatively large and complex power supplies for their operation. One reason for this is that the number of magnetic cores necessary to obtain desired logic depth in a particular computer operation, or to obtain desired variety of different logic functions, often runs well into the thousands. Since each core requires an appreciable amount of power for its operation, the total power requirement thus becomes very substantial. Another important cause of undesirably high power consumption in these prior circuits is that it usually is necessary to connect many cores in series relation to the power supply, thus raising voltage supply requirements and necessitating use of power-dissipating load resistors for voltage reduction at some of the cores.

Moreover, serial connection of the magnetic cores necessarily gives rise to substantial potential differences between cores and between the cores and ground. These potential differences pose severe insulation requirements, and are attended by undesirable capacitive effects and stray noise voltages which may seriously detract from reliability of circuit operation.

The present invention has as a primary object the provision of magnetic core logic circuits wherein power supply requirements are minimized to avoid the foregoing and other disadvantages of prior such circuits. A further object of the invention is the provision of magnetic core logic circuits wherein potential differences between cores and between the cores and ground are minimized, thus simplifying insulation requirements and reducing capacitive effects and stray noise voltages.

Another object of the invention is the provision of magnetic core logic circuits wherein all core elements of each logic stage are connected in parallel to a common alternating voltage power supply, with core elements of alternate stages being made operative on alternate half cycles of the alternating voltage supply by unidirectional current flow means included in the core connections.

It is also an object of the invention to provide magnetic core logic circuits easily adaptable by different circuit connection to provide any of many different control and logic functions in digital computers and like devices.

In carrying out the invention in one form, a plurality of saturable magnetic cores are each provided with input, output and advance windings, with the advance windings of all cores of each logic stage being connected in parallel to a common alternating voltage power supply. The core advance windings are interconnected through unidirectional current flow means to other core windings or ground in a manner such that current may flow from the power supply through the advance windings of all cores of alternate logic stages on alternate half cycles of the alternating voltage supply. The core windings and unidirectional flow means are further interconnected in any of several different modes each enabling the circuit to perform a desired one of many different logic functions.

The invention will be more fully understood and its various objects, features and advantages further appreciated by reference to the appended claims and the following detailed specification when read in conjunction with the accompanying drawings wherein:

Figure 1 is a schematic of a shifting register incorporating magnetic core elements in accordance with the invention; and Figures 2–5 inclusive are schematics of various other logic units incorporating magnetic core circuits in accordance with the invention.

With continued reference to the drawings, wherein like reference numerals have been used throughout to designate like elements, the circuit schematic of Figure 1 illustrates a three stage cascade shifting register of the general type used in digital computers for data storage, time delay and other purposes.

As shown, this circuit comprises a plurality of magnetic core elements 11, 12 and 13, each including a saturable core of toroidal configuration. These cores may comprise ceramic bobbins having one or more layers of magnetic tape wrapped about them, or if preferred each core may consist of a single solid piece of magnetic material of toroidal or other suitable configuration. In all cases, however, the core material and configuration preferably are such as to provide generally rectangular hysteresis characteristics, so that the cores possess two possible states of magnetic saturation and may be flipped from one state to the other by magnetomotive force generated by current flow through one of the core windings.

For convenience, one possible state of magnetic saturation of each core may be arbitrarily specified as its "one" state, and the other its "zero" state. As will be apparent to those skilled in the art, the change in magnetic flux in the core which accompanies a change from the "one" to the "zero" state, or vice versa, gives rise to induced voltages in the core windings of magnitudes determined by the number of turns of the windings and the rate of change of core flux.

Each of cores 11, 12 and 13 is shown in Figure 1 as having three windings; an input winding 15, an advance winding 16 and an output winding 17. The advance windings 16 of all cores are connected to a common alternating voltage power supply 19, the voltage output of which may be of either square wave or sine wave form, the latter being preferred by reason of the greater simplicity and substantially lower cost of sine wave generators and amplifiers. The output frequency of this power supply 19 determines the rate at which the shift register operates (the computer digit rate), and therefore is preferably made as high as possible consistent with satisfactory performance. A power supply frequency of the order of 150 kilocycles has been found suitable for most applications and provides relatively high operating speed.

As shown, an impedance element comprising a resistor 21 and inductor 22, the latter being of ferrite core or other suitable type, is interposed in the connection between each of the core advance windings 16 and the power supply 19, for purposes of stabilizing current flow to the core windings and preventing any voltages induced in the windings with change of core state from reflecting back to the power supply.

The advance winding 16 of the first core 11 is connected to the output winding 17 of that core through unidirectional current flow means 24, and is connected through a second unidirectional current flow means 25 to the input winding 15 of the next succeeding core 12. Similarly, the advance winding 16 of core 12 is connected through unidirectional current flow means 27 and 28 to the core 12 output winding 17 and to the core 13 input winding 15. These unidirectional current flow means may be of any suitable conventional type but preferably are semiconductor diodes utilizing either germanium or silicon as the semiconductive material.

In operation with the diodes connected with polarities as shown in Figure 1, during the positive half cycle of the power supply voltage electrical current flows through the resistor 21, inductor 22 and the advance windings 16 of all odd-numbered cores, i.e., cores 11 and 13 in Figure 1, and current flow to the even-numbered core 12 is blocked by diodes 27 and 28. From the advance winding 16 of the first or input core 11, the current finds parallel paths one through the output winding 17 of that core, and one through the input winding 15 of the next following core 12.

As previously noted, any change in magnetic state of core 11 will give rise to an induced voltage in its output winding 17, hence if the power supply current through advance winding 16 is effective to flip the core from one magnetic state to the other, then a back voltage will be induced in output winding 17 tending to oppose current flow through the output winding and through diode 24 connected thereto. This back voltage across winding 17 and diode 24 permits little if any power supply current flow therethrough, and thus compels the current to pass through diode 25 and the input winding 15 of the next following core 12, causing that core to change its magnetic state.

Conversely, if power supply current flow through advance winding 16 of core 11 does not cause that core to change its magnetic state, then no back voltage is induced in its output winding 17 and the power supply current from the advance winding is shunted through diode 24 and output winding 17 of core 11 directly to ground, with little if any current flow through diode 25 to the input winding 15 of the next following core 12. The magnetic state of core 12 therefore will not be changed under these circumstances.

It is apparent from the foregoing that the initial state of core 11 determines whether the second stage core 12 does or does not change magnetic state during the positive half cycle of power supply voltage; i.e., if core 11 was initially storing a "zero" then the power supply current effectively is shunted to ground through diode 24 and the output winding 17 of core 11; if core 11 was initially storing a "one" then the positive half cycle of power supply voltage is effective to flip the core back to its "zero" state and, in doing so, to induce a back voltage in its output winding 17 forcing the power supply current to flow through diode 25 and input winding 15 of the next following core 12, thus causing that core to flip from its "zero" to its "one" state.

Since the positive half cycle of power supply voltage always is effective to flip the core 11, as well as all other odd-numbered cores, to their "zero" state if they are not already in that state, the core 11 always will be storing a "zero" except when a "one" signal has been applied to its input winding 15 during the power supply negative half cycle just preceding the positive half cycle under consideration. This input signal to core 11 may be from an arithmetic or other logic element constituting the input to the shift register, and is synchronized with the register power supply in any convenient manner as by common connection to the alternating voltage power supply.

During each negative half cycle of the power supply alternating voltage, current flows through the advance windings 16 of all even-numbered cores, such as core 12 in Figure 1, and then is either effectively shunted to ground through the output windings 17 of those cores or is made to pass through the input windings 15 of the next following odd-numbered core, depending on whether a "zero" or a "one" was shifted into the even number core during the preceding positive half cycle of supply voltage. This same cycle of operation applies to all cores in the shift register, so that a "one" signal inserted in core 11 during one negative half cycle of power supply voltage will be shifted to core 12 during the next positive half cycle, then shifted to core 13 during the next negative half cycle, and so on through the entire register. Similarly, if a "zero" (i.e., no "one" signal) is inserted in the input core 11 the output of the register will remain at "zero."

In practice, it generally is desirable to make the number of turns in the core output windings 17 larger than the number in the input windings 15, so that the volts per turn ratio of the output winding of one core is substantially higher than the volts per turn ratio of the input winding of the next following core when both windings have the same voltage applied across them. This means the back or "bucking" voltages induced in the core output windings normally will exceed those induced in the input windings if the cores are changing magnetic state at the same rate, and insures that the second core will have completed its change of magnetic state by the time the first core has completed its change. With cores having advance windings of 20 turns, for example, the input and output windings may suitably be 25 and 45 turns, respectively.

Preferably, a D.-C. bias supply connected as shown at 32 in Figure 1 is provided in each of the core input winding circuits, except that of the first core 11, with the bias voltages being of magnitude such as to cancel the effect of the forward resistance of diodes 24 and 27. This minimizes the possibility of response by cores 12 and 13 to spurious signals such as the relatively small voltages which may be transmitted to the core input windings even in the absence of a change of magnetic state in the next preceding core. Such biasing is particularly useful where it is necessary to employ cores having rounded hysteresis loops, but biasing generally is not essential to operation of circuits in accordance with the invention and therefore may sometimes be omitted if desired. Also, it is possible to achieve substantially the same result by making the diodes 25 and 28 of higher forward resistance than diodes 24 and 27.

It is to be noted that the diodes 24 and 25 associated with core 11, and the corresponding diodes associated with the other cores, each serve additional purposes distinct from that of permitting power supply current to flow through the core advance windings only during the proper half cycle of supply voltage. Thus, the diode (24 or 27) connected between the advance and output windings of each core also serves to prevent current flow from the output winding of one core through the input winding of the next core both when the first core is receiving an input, and when the first core advance winding is passing power supply current. In other words, this diode prevents an induced voltage in the output winding of one core from contributing to the current flow to the input winding of the next core and from being shorted to ground through that core input. The diode (25, 28 or 31) connected between the advance winding of each core and the input winding of the next core serves also to prevent information from shifting in a reverse direction through the register.

While the cores in Figure 1 are shown as each having only three windings, it will be understood that additional windings may be provided if desired for purpose of reset, readout or the like. Similarly, while the shift register of Figure 1 is shown with only three stages, it is apparent that any desired number of stages may be incorporated and that use of a relatively large number of stages is greatly facilitated by the minimized power supply requirements characteristic of magnetic core logic circuits in accordance with the invention.

Figures 2, 3:
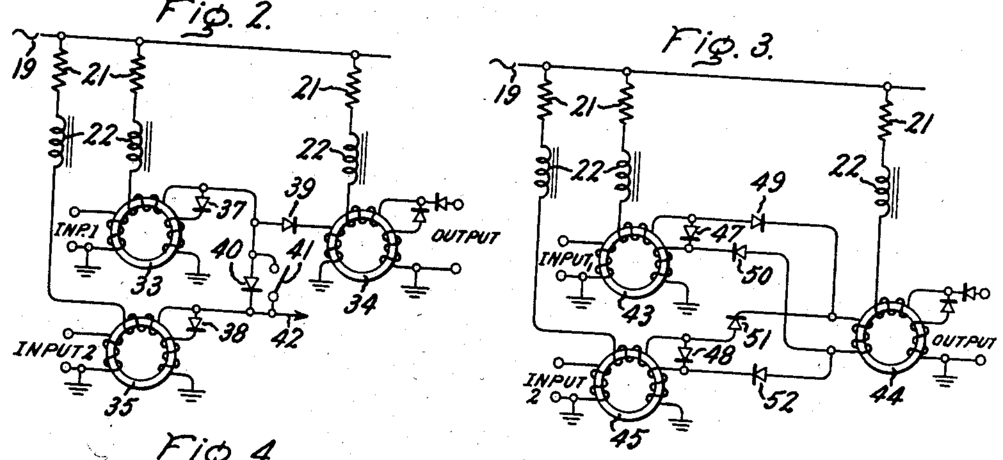

As previously noted, the magnetic core circuits of the invention may be applied in many other different logic units such as those shown in Figures 2–5 by way of example. Figure 2 illustrates a logical "AND" circuit the function of which is to combine inputs in a manner such that the output is the lesser of the inputs. In other words, if any input is a "zero," the output will be "zero," and will be a "one" only if all inputs are "ones."

The circuit of Figure 2 incorporates three cores 33, 34 and 35 each connected to the alternating voltage power supply through an impedance network 21—22 as described hereinabove with reference to Figure 1. The odd-numbered cores 33 and 35 comprising one stage of the logic unit of Figure 2 have their advance and output windings connected together through diodes 37 and 38, respectively, and the output windings of the first stage cores 33 and 35 are shown connected to the input winding of core 34 in the next stage through diodes 39 and 40. Except in certain applications as hereinafter explained, however, one of these diodes (diode 40) is normally omitted or short circuited as by the switch means 41 shown. As in the circuit of Figure 1, the cores in Figure 2 preferably have a larger number of turns in their output windings than in their input windings.

With switch 41 closed, the power supply when in the positive half of its alternating voltage cycle will cause current to flow from the supply through the impedance 21—22 and the advance windings of the odd-numbered cores 33 and 35. Then, since the two advance windings are directly tied together, there are three possible paths which the current may take to ground. These possible paths include (1) the output winding of core 33, (2) the output winding of core 35, and (3) the input winding of core 34. The back voltage across the core 33 and 35 output windings will be either substantially zero or will be larger than the advance winding voltage and in a direction to oppose flow of the advance winding current through the output winding, depending on whether the respective core 33 or 35 changes magnetic state (i.e., depending on whether the core was initially storing a "zero" or a "one"). The path through the input winding of core 34 will have a relatively lower voltage opposing the flow of current, which voltage arises by reason of the fact that this core must change magnetic state if current is to flow through its input winding.

The power supply current through the advance windings of cores 33 and 35 seeks the path of lowest opposing voltage to ground, hence if either 33 or 35 is initially in the "zero" state the current will flow through the output winding of that core to ground, since there then is essentially zero opposing voltage across the output winding. Therefore, little if any current will flow through the input winding of core 34 and that core will remain in its "zero" state. If, on the other hand, both cores 33 and 35 are storing "ones" then both will flip to their "zero" state and the output winding of each will have induced across it a back voltage opposing the power supply voltage and larger than any back voltage across the input winding of core 34. Under these conditions, the power supply current must flow through diode 39 to the core 34 input winding, thereby changing the magnetic state of that core. Accordingly, core 34 is flipped to its "one" state only if both cores 33 and 35 were initially storing "ones," in accordance with the previously explained function of the logical "AND" circuit.

If switch 41 is opened to connect diode 40 between the output windings of cores 33 and 35, then this diode acts to prevent any current flow from core 35 to core 33 regardless of the magnetic state of the latter core. Core 35 can, therefore, be used to drive cores other than core 34, i.e., core 33 will not interfere with transfer of the "zero" or "one" stored in core 35 to other cores (not shown) through a lead 42 connected between diodes 38 and 40 as shown.

With diode 40 shorted by switch 41, the operation of core 35 would be influenced by the state of core 33, since if core 33 were storing a "zero" and accordingly had no back voltage across its output winding, then the current through the core 35 advance winding could flow to ground through the very low impedance of the core 33 output winding. This would cause the voltage at the upper end of diode 38 in the core 35 output circuit to remain substantially at zero volts regardless of whether that core was initially storing a "zero" or a "one," thus precluding transfer of information concerning its initial state to other cores.

Regardless of whether switch 41 is in or out of circuit, the "AND" circuits just described may have any desired number of inputs; the parallel connection of all cores to the power supply permits use of large numbers of cores without imposing unduly severe requirements on the power supply. While no bias voltage sources are shown connected in the core input windings in the circuit of Figure 2, or in the circuits of Figures 3–5, it will be understood that such voltage sources may be provided if desired and, if used, may be connected as shown in Figure 1.

Referring now to Figure 3, an "exclusive OR" circuit is shown. The logical function of this circuit is to give a "zero" output if the inputs are alike and a "one" output if the input digits are not alike.

The circuit as shown includes three cores 43, 44 and 45 and six diodes 47–52 inclusive, interconnecting the core windings in a manner such that the odd-numbered cores 43 and 45 constituting the first stage of the unit provide an output during the positive half cycle of the alternating voltage power supply. Current then flows from the supply through the impedance 21—22 and the advance windings of cores 43 and 45.

If both input cores 43 and 45 are storing a "zero," there will be no bucking voltage generated across their respective output windings and the power supply current therefore will be shunted to ground through these output windings. Accordingly, no current will flow through the input winding of core 44, and that core will remain in its "zero" state.

If both cores 43 and 45 contain a "one" the power supply current through their advance windings will induce equal bucking voltages across their respective output windings, opposing current flow through the output windings. Since like voltages are applied through diodes 49–52 to both ends of the core 44 input winding, however, the advance current from cores 43 and 45 finds no available path to ground through the core 44 input winding. Rather, the core 43 advance current will flow to ground through the output winding of that core, despite the bucking voltage across the same, and the advance current from core 45 will flow to ground through the output winding of that core. Little if any current will flow through the input winding of core 44 and that core therefore will remain set in its "zero" state.

If core 43 is storing a "one" and core 45 contains a "zero," then the advance current from core 43 finds a low impedance path to ground through the output winding of core 45, there being no back voltage across the output winding under these conditions. The output winding of core 43, on the other hand, will have generated across it a bucking voltage opposing the flow of current from the core advance winding. The advance current will follow the path of minimum bucking voltage; hence it will flow through diode 49 to the input winding of core 44, through that input winding (which generates a relatively smaller bucking voltage due to its smaller number of turns), and then flows from the core 44 input winding through diode 52 to the core 45 and through its output winding to ground. This flow of current through the core 44 input winding will store a "one" in that core.

Since cores 43 and 45 are symmetrically connected through their associated diodes, the presence of a "one" in one core and a "zero" in the other will set core 44 to its "one" state regardless of which of the cores 43 and 45 is storing the "one." Since it also has been shown that "ones" or "zeros" in both cores 43 and 45 will permit core 44 to remain in its "zero" state, it is apparent that the circuit of Figure 3 performs the desired function of the "exclusive OR" circuit.

Additional cores may be connected to the input winding of core 44 in the same manner that the windings of cores 43 and 45 are connected thereto. The result is that a "one" is set in core 44 if all inputs are not alike (at least one "one" and at least one "zero"). A "zero" will be stored in core 44 if all inputs contain "ones" or all contain "zeros."

Figures 4, 5:
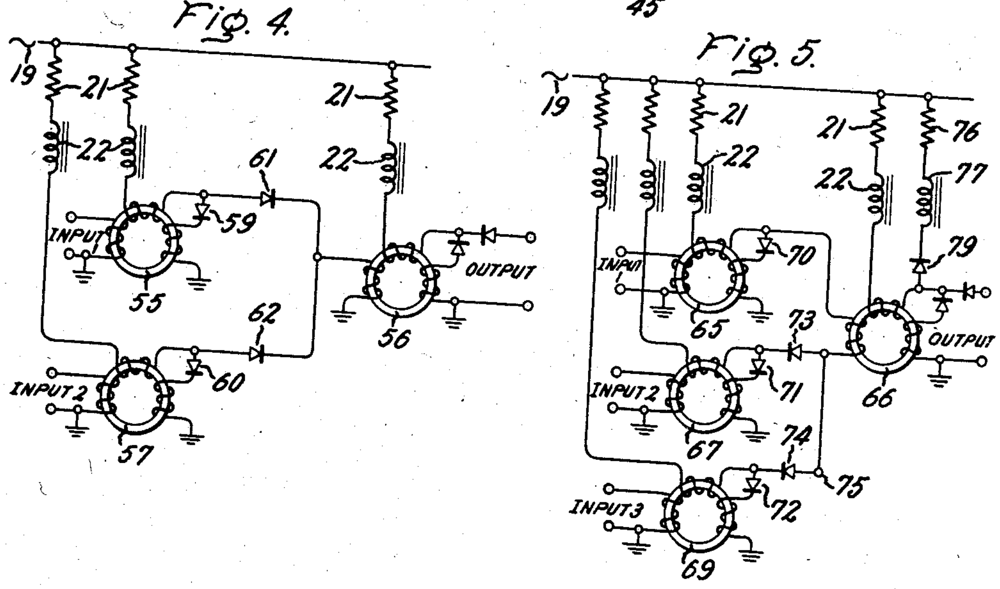

Turning now to Figure 4, there is shown a logical "OR" circuit the function of which is to combine two inputs in a manner such that the result is equal to the larger of the inputs. For example, if there are two inputs either of which can be a "one" or a "zero," then the result will be "one" if either or both inputs are "one," and will be "zero" if both inputs are "zero."

The circuitry used to obtain this result includes three cores 55, 56 and 57 having their output windings connected with each other and with other core windings through diodes 59–62 arranged as shown. With diode polarities as indicated, the odd-numbered cores 55 and 57 constituting the first or input stage of the unit are active during the positive half cycle of the power supply alternating voltage.

In operation, during this positive half cycle current will flow from the power supply through the impedances 21—22 and the advance windings of cores 55 and 57, causing each core to change state if it initially contains a "one" or to remain in its initial state if it contains a "zero." Considering core 55, there are two parallel paths for power supply current from its advance winding to ground, one path through its own output winding and one through the input winding of core 56. The core 55 output winding will have a bucking voltage generated across it if the core is changing its magnetic state, but will have no voltage if the core is not changing its magnetic state. If the advance current takes the path through core 56 input winding, that core will flip to its "one" state and accordingly will generate a bucking voltage opposing such current flow through its input winding.

Since the number of turns on the core 55 output winding substantially exceeds that on the core 56 input winding, however, the bucking voltage across the core 55 output winding always will be either substantially larger than that across the core 56 input winding, or will be approximately zero if core 55 does not change state. Therefore, the advance current from the power supply will flow either through the input winding of core 56 if core 55 changes magnetic state, or if core 55 does not change magnetic state then through the output winding of that core. The magnetic state of core 55 thus is transferred to core 56, and since core 57 operates in exactly the same manner as core 55, it also transfers any change of its magnetic state to core 56.

The diodes 61 and 62 connected between the core 55 and 57 output windings and the core 56 input winding prevent the advance current from core 55 from flowing to ground through the output winding of core 57 independently of whether core 55 changes state or not, and vice versa. It follows, therefore, that if either core 55 or core 57 or both change magnetic state, then the advance current can reach ground only through the input winding of core 56, thus causing that core to change state. Since core 56 changes magnetic state if either core 55 or 57 or both change state, the conditions of the "OR" circuit are fulfilled.

As in the circuits of Figures 2 and 3, the number of inputs which can be combined in the "OR" circuit of Figure 4 may be as large as desired since all cores are connected in parallel to the power supply.

With reference now to Figure 5, there is shown an "inhibit" circuit which functions to combine two or more inputs in a manner such that the output will be a "one" if the first input is a "one" and one or more of the other inputs is a "zero," but will be "zero" for any other combination of inputs.

The circuit of Figure 5 includes four magnetic cores 65, 66, 67 and 69 with their windings interconnected through diodes 70–74 arranged as shown. Considering first the operation of cores 65–67 and ignoring for the moment the presence of core 69, power supply current flows through the impedances 21—22 and the advance windings of cores 65 and 67 during positive half cycles of the alternating voltage supply. From the advance winding of core 67, the current must flow to ground through the output winding of that same core since the only other possible path is blocked by the back resistance of diode 73. From the advance winding of core 65, however, there are two possible paths to ground, one through the output winding of that core and one through the input winding of core 66 in series with diode 73 and the output winding of core 67.

If a "one" is initially stored in core 65 and a "zero" is stored in core 67, then during the power supply positive half cycle a bucking voltage will be generated across the output winding of core 65 since that core changes magnetic state, but such voltage will not be generated across the output winding of core 67 since it does not change state. While any current flow through the input winding of core 66 will cause that core to change magnetic state and thus induce a bucking voltage across its input winding, this induced voltage will be less than that across the core 65 output winding because of the lesser number of turns in the core 66 input winding. Accordingly, if core 65 is storing a "one" and core 67 a "zero," the advance current from core 65 will flow through the input winding of core 66 and output winding of core 67, the path of least opposing voltage, and a "one" will thus be transferred to core 66.

If core 65 and core 67 are both storing "ones," then the advance current from core 65 will be opposed by bucking voltages across the output windings of both core 65 and core 67. Since these bucking voltages are of like magnitude, there will be no current flow through the input winding of core 66 and that core will retain its initial magnetic state unchanged.

Similarly if core 65 is initially storing a "zero," there will be no bucking voltage generated across its output winding and the advance current therefore will flow directly to ground through this path independently of the state of core 67. Under these conditions, core 66 will again retain the "zero" initially stored in it.

Considering now the function of core 69, it is apparent that since this core is connected to the input winding of core 66 in precisely the same manner as core 67, it will function to inhibit the transfer of information from core 65 to core 66 in the same manner as does core 67. The net result of this multiple inhibit is the storing of a "one" in core 66 if core 65 contains a "one" and either core 67 or core 69, or both, contain a "zero," and the retention of "zero" in core 66 with any other combination of inputs.

It will be understood that this multiple inhibit circuit may include any desired number of inhibiting core units, each having an output terminal like terminal 75 of core 69 connected to form one possible ground return for the input winding of the core being inhibited. Similarly, an inhibiting core such as core 69 in Figure 5 may be used to inhibit more than one other core, merely by connecting its terminal 75 to form the ground return for all cores to be inhibited thereby. The inhibited core or cores may have any of many different logic functions. For example, the "AND" circuit of Figure 2 may be inhibited by adding an inhibiting core such as core 69 of Figure 5, with its terminal 75 connected to replace the direct ground return shown for the core 34 input winding in Figure 2. The "OR" circuit of Figure 4 may be similarly inhibited if desired.

It will be noted that the advance winding of core 66 in Figure 5 differs in its connection to the alternating voltage power supply 19, in that it includes a power supply connection at both ends of the winding. This modified form of power supply connection is for the purpose of providing sufficient current output from core 66 to drive the input windings of a plurality of succeeding cores (not shown), as is frequently desired in complex circuits.

This additional "boost" power supply connection includes a resistor 76 and inductor 77 similar to the impedance elements 21 and 22 previously described, and further includes a diode 79 connected as shown to prevent any power supply current flow through the boost connection during the positive half cycle of power supply voltage. During the negative half cycle, however, power supply current is passed by diode 79 and adds to that passing through the core advance winding. If the core contains a "zero" this additional "boost" pulse will be drained off to ground through the core output winding, just as is the advance current in the circuits previously described. If the core is flipping a "one," however, then current flow through the core output winding is blocked by the induced voltage, just as the advance current is blocked, and the boost pulse therefore supplements the advance current to provide sufficient output current to insure that a plurality of following cores all will be flipped to their "one" state.

While desirable for many applications, the boost circuit just described is not always essential to enable a plurality of cores to be driven from a single preceding core. Sufficient power for this purpose often may be obtained merely by proper adjustment of the values of impedance elements 21 and 22, or by varying the number of turns in the driving core advance winding.

While only certain preferred embodiments of the invention have been shown and described in the foregoing, many modifications will occur to those skilled in the art and it therefore should be understood that the appended claims are intended to cover all such modifications as fall within the true spirit and scope of the invention.

What is claimed as new and which is desired to secure by Letters Patent of the United States is:

1. A magnetic core logic circuit comprising first and second saturable magnetic core elements each having a plurality of windings thereon, a power source connected to supply an alternating voltage to one end of one winding of both said core elements, and unidirectional current flow means interconnecting the other end of said one winding of each core element with other of said core windings in a manner to permit current flow through said one winding of said first core element only during one half cycle of said power source alternating voltage and current flow through said one winding of said second core only during the other half cycle of alternating voltage.

2. In a magnetic core logic circuit, a plurality of saturable magnetic core elements together defining first and second logic stages and each said core element including a plurality of windings thereon, an alternating voltage power source, means connecting one end of one winding of all said core elements in parallel to said power source, and unidirectional current flow means interconnecting the other end of said one winding of each said core element with other of said core windings in a manner to permit current flow from said power source through said one winding of all core elements of said first logic stage only during one half cycle of said power source alternating voltage and current flow through said one winding of all core elements of said second logic stage only during the other half cycle of alternating voltage.

3. In a magnetic core logic circuit, a plurality of saturable magnetic core elements together defining a plurality of logic stages and each said core element including input, advance and output windings thereon, an alternating voltage power source, means connecting one end of the advance windings of all said core elements in parallel to said power source, and unidirectional current flow means interconnecting the other end of said advance winding of each said core element with the output winding of the same core element and with the next stage core input windings in a manner to permit current flow from said power source through the advance windings of the core elements of all even-numbered logic stages only during one half cycle of said power source alternating voltage and current flow through the advance windings of the core elements of all odd-numbered logic stages only during the other half cycle of alternating voltage.

4. In a magnetic core logic circuit, a plurality of saturable magnetic core elements together defining a plurality of logic stages and each said core element including input, output and advance windings thereon, an alternating voltage power source, impedance means connecting one end of the advance windings of all said core elements in parallel to said power source, first unidirectional current flow means connecting the other end of said advance winding of each core element with the output winding of that core element, and second unidirectional current flow means connecting said other end of said core advance windings with the next stage core input windings and cooperative with said first unidirectional current flow means to permit current flow from said power source through the advance windings of the core elements of all even-numbered logic stages only during one half cycle of said power source alternating voltage and current flow through the advance windings of the core elements of all odd-numbered logic stages only during the other half cycle of alternating voltage.

5. A magnetic core logic circuit comprising a plurality of saturable magnetic core elements together defining a plurality of logic stages and each said core element including input, output and advance windings thereon, an alternating voltage power source, means connecting one end of the advance windings of all said core elements in parallel to said power source, first unidirectional current flow means in each logic stage connecting the other end of said advance winding of each core element of that stage with the output winding of the same core element, said first unidirectional flow means in alternate logic stages being of opposite polarities, and second unidirectional current flow means in each logic stage connecting said other end of said core advance windings with the next stage core input windings and cooperative with said first unidirectional current flow means to permit current flow from said power source through the advance windings of the core elements of all even-numbered logic stages only during one half cycle of said power source alternating voltage and current flow through the advance windings of the core elements of all odd-numbered logic stages only during the other half cycle of alternating voltage, whereby the magnetic state of each core element at the time its advance winding current flow begins determines whether the advance current is shunted through the output winding of that core or is urged to pass through the next stage core input windings.

6. A magnetic core logic circuit as defined in claim 5 wherein each said logic stage comprises a single core element and said second unidirectional current flow means of successive stages are of alternating polarities, whereby an input to the first stage core element is sequentially shifted through the subsequent stages.

7. A magnetic core logic circuit as defined in claim 5 wherein the first logic stage comprises a plurality of core elements each having an input and wherein the second stage comprises a single core element, said second unidirectional current flow means being arranged to provide an input to the second stage core element corresponding to the lesser of the first stage inputs.

8. A magnetic core logic circuit as defined in claim 5 wherein the first logic stage comprises two core elements each having an input and wherein the second stage comprises a single core element, said second unidirectional current flow means being arranged to provide an input to the second stage core element when the first stage inputs are unlike and to provide no input to the second stage core element if the first stage inputs are both alike.

9. A magnetic core logic circuit as defined in claim 5 wherein the first logic stage comprises a plurality of core elements each having an input and the second stage comprises a single core element, said second unidirectional current flow means being arranged to provide an input to said second stage core element corresponding to the larger of the inputs to the first stage core elements.

10. A magnetic core logic circuit as defined in claim 5 wherein the first logic stage comprises a plurality of core elements each having an input, said second unidirectional current flow means being arranged to permit all but one core element of said first stage to inhibit transfer by the remaining first stage core element of an input to the second logic stage.

11. A magnetic core logic circuit as defined in claim 5 wherein both ends of the advance winding of at least one core element are connected to said power source, one such connection including unidirectional current flow means therein operative to augment output current flow from said one core element.

12. A magnetic core logic circuit as defined in claim 5 wherein the first logic stage comprises a plurality of core elements each having an input and an output, said second unidirectional flow means being arranged to provide an input to a core element of the second logic stage corresponding to the lesser of the inputs to the first stage core elements and means including a third unidirectional current flow means to provide an output from one of said core elements of said first stage determined only by the input to said one first stage core element.

No references cited.